United States Patent [19]

Ng et al.

[11] Patent Number: 5,699,102
[45] Date of Patent: Dec. 16, 1997

[54] NON-IMPACT COPIER/PRINTER SYSTEM COMMUNICATING ROSTERIZED, PRINTER INDEPENDANT DATA

[75] Inventors: Yee S. Ng, Fairport; Eric K. Zeise, Pittsford, both of N.Y.

[73] Assignee: Eastman Kodak Company, Rochester, N.Y.

[21] Appl. No.: 597,456

[22] Filed: Oct. 15, 1990

[51] Int. Cl.$^6$ .......................... B41J 2/435; G03G 21/00; H04N 1/00; H04N 1/40
[52] U.S. Cl. .................. 347/224; 347/232; 347/237; 347/240; 399/2; 358/401; 358/444
[58] Field of Search .................. 346/107 R; 355/200, 355/202; 358/75, 80, 443, 444, 446, 447, 455, 401, 403, 442

[56] References Cited

U.S. PATENT DOCUMENTS

| | | | |
|---|---|---|---|
| 4,298,269 | 11/1981 | Yoshimaru et al. | 358/300 |
| 4,655,577 | 4/1987 | Ikuta | 358/296 X |
| 4,814,891 | 3/1989 | Uchiyama et al. | 358/296 |
| 4,835,549 | 5/1989 | Somejima et al. | 347/237 |
| 4,897,639 | 1/1990 | Konayama | 347/237 X |
| 4,916,561 | 4/1990 | Ng et al. | 399/2 X |
| 4,959,731 | 9/1990 | Fukae | 358/300 |
| 5,016,114 | 5/1991 | Sakata et al. | 358/404 |
| 5,072,310 | 12/1991 | Yamamoto et al. | 358/444 X |

OTHER PUBLICATIONS

Research Magazine by Kodak Research Labs Fall 1988, pp. 18–21, by E. Zeise, Darice–Independent Electronics Color Data Interchange.

Primary Examiner—David F. Yockey
Attorney, Agent, or Firm—Norman Rushefsky

[57] ABSTRACT

A copier/printer system includes an image scanner for scanning a document and providing, after a compression step, digital image scanning signals, $P_1$, that may be communicated to a computer system for display and editing or alternatively communicated to a grey level printer having a magnetic tape memory. The computer system may be used to display the scanned image for editing by an operator and is coupled to the printer so that the edited image signals, $P_2$, which may be the scanned signals and a common page description language to modify its usage, may be printed by the printer. The edited image signals, $P_2$, may be sent to the printer over a suitable network. The printer includes image processing electronics for transforming the edited data, $P_2$, into device independent data signals, $P_3$. Such signals may be received by printers of the same type; i.e., those employing similar process and halftone algorithms. The signals, $P_3$, are then converted by a look-up table in the printer to device dependent signals, $P_4$, for printing by the printer. The signals, $P_3$, are stored in memory which may be recirculated for making multiple copies. The memory medium storing the $P_3$ signals may be transported or otherwise communicated to other printers of the same type for reproducing the data since the data is in common data signal or device independent form. The memory medium storing the $P_3$ signals may also store the $P_1$ and/or $P_2$ signals for re-editing purposes using the computer and display.

11 Claims, 4 Drawing Sheets

NON-IMPACT COPIER/PRINTER SYSTEM COMMUNICATING ROSTERIZED, PRINTER INDEPENDANT DATA

BACKGROUND OF THE INVENTION

1. Field of the Invention

The invention relates in general to non-impact copiers/printers, and more particularly to an integrated system incorporating same with a display and editing means and finds a particular applicability for copying multipage documents.

2. Description of the Prior Art

In the prior art, as exemplified by U.S. Pat. No. 4,655,577, non-impact printers are described having a scanner for scanning a document and converting the scanned information on the document into digital signals that are processed for printing. The scanner signals may be modified by editing signals and such edited signals printed. In addition, the edited signals may be stored on a magnetic tape which may be removed and used in other printers. A problem with such printers is that each time the printer is required to make copies, the data needs to be processed into a format suitable for driving the printing head. Such processing may involve for a color printer with grey level printing capability the following processes: color decompression and page description decoding, unsharp masking and conversion of R, G, B signals to Y, M, C signals, color correction, halftone generation and optionally undercolor removal or gray-component replacement with black generation for printing with cyan, magenta, yellow and black colorants. The processing of such data is time consuming, particularly where multiple copies of a multipage document are desired. It is therefore an object of the invention to provide a non-impact copier/printer system with improved productivity.

SUMMARY OF THE INVENTION

This and other objects of the invention are carried out by a copier/printer system comprising image scanner means for scanning a document sheet and generating digital signals in a first form representing the image scanned; a computer system responsive to the digital signals for displaying and editing the image of the document sheet and for outputting digital signals in a second form representing an edited version of the original document sheet; printer means responsive to the digital signals on a second form for modifying said signals into a third form in which the signals are rasterized for grey level printing, said printer means further including memory means for storing said signals in said third form; uniformity correction means for correcting data stored as signal of said third form by modifying said data to signals of a fourth form so that said data is corrected for the output of said particular printer means; said memory means being removable so that the data stored thereon as signals of said third form may be printed using a printer having its own uniformity correction means.

The invention is further carried out by a copier/printer system comprising image scanner means for scanning a document sheet and generating digital signals in a first form representing the image scanned; a computer system responsive to the digital signals for displaying and editing the image of the document sheet and for outputting digital signals in a second form representing an edited version of the original document sheet; printer means responsive to the digital signals in said second form for modifying said signals into a third form in which the signals are rasterized for grey level printing, said printer means further including memory means for storing said signals in said third form; uniformity correction means for correcting data stored as signal of said third form by modifying said data to signals of a fourth form so that said data is corrected for the output of said particular printer means; network means communicating said memory means to other printer means; other printing means coupled to said memory means through said network means, said other printer means including uniformity correction means so that the data stored in said memory means as signals of said third form may be corrected by said uniformity correction means to signals of said fourth form for printing by said other printing means.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
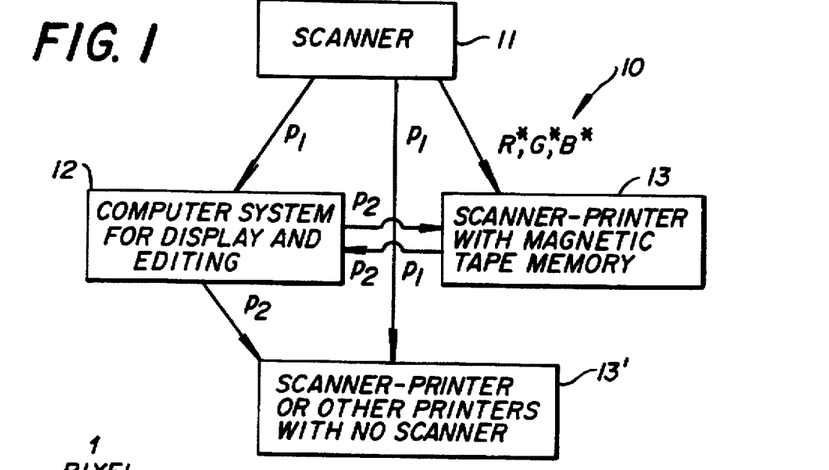
FIG. 1 is a block diagram of a copier/printer system made according to the invention.

With reference to FIG. 1, the architecture of a color copier/printer system with magnetic tape memory is illustrated. The tape memory is used as an electronic recirculating feeder and also can be used as a customer removable media. The system is separated into three parts, the scanner 11 (FIG. 2), an optional display and editing means 12 (FIG. 3) and a printer 13 with streaming magnetic tape as an electronic recirculating feeder and another optional tape serve as a customer removable media (FIG. 4).

Figure 2:
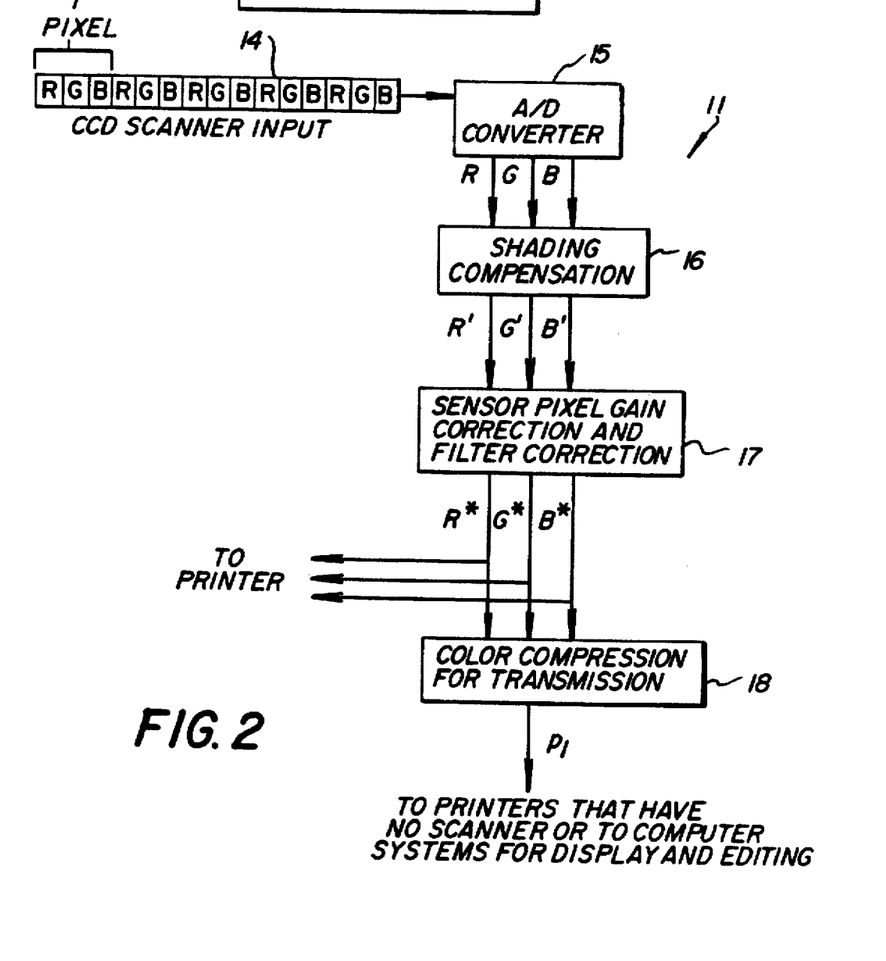
FIG. 2 is a block diagram of a scanner unit that is incorporated in the system of FIG. 1.

The scanner 11 has a scanner input unit 14 of CCD's with R, G, and B (red, green and blue) inputs served as a combined 1 pixel input for scanning. It can be accomplished by either an integral filtered array of 3 colors on a linear CCD array or can be accomplished by 3 rows of respectively filtered CCD's. Combinations including RGBGRGBG sensors in a respective repeating layout instead of the described RGBRGB sensor layout may be provided to improve on system sharpness. However, interpolation to RGB signals from RGBGRGBG signals will be required. A suitable light source is provided for illuminating a document while supported on a support so that the document is scanned by the scanner input unit. The signals from the CCD sensors are processed through an A/D converter into parallel digital R, G, B data. A shading compensation circuit for lamp and sensor nonuniformity correction is provided to give R', G' and B' signal. These data are then processed through sensor gain nonuniformity correction circuit (sensor gain is different from CCD pixel to pixel, so is the dark current, so $R'(i)=[R(i)-DC(i)]*G(i)$, whereas $DC(i)$ is the dark current for pixel $i$ and $G(i)$ is the gain for pixel $i$) and spectral response correction to give out real R*, G* and B* information for each pixel. If a printer unit is associated with this scanner, then only R*, G* and B* need to be sent along. However, if the color data has to be transmitted to another external printer or other computer system for display and editing, the R*, G* and B* data will be compressed with some of the popular algorithms (DPCM, DCT and BTC, etc.), here we have designated as P1 the signals after compression and transmission unit 18. The R*, G* and B* data may be converted to a known uniform color space data like L*, a* and b* before compression and transmission is done.

Figure 3:
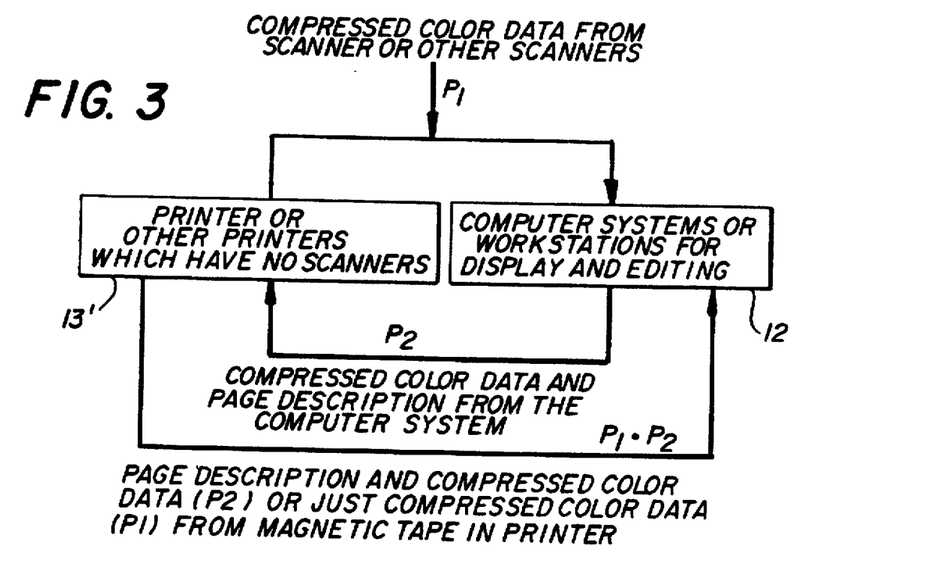
FIG. 3 is a block diagram of a signal network in the copier/printer system of the invention.
Figure 4:
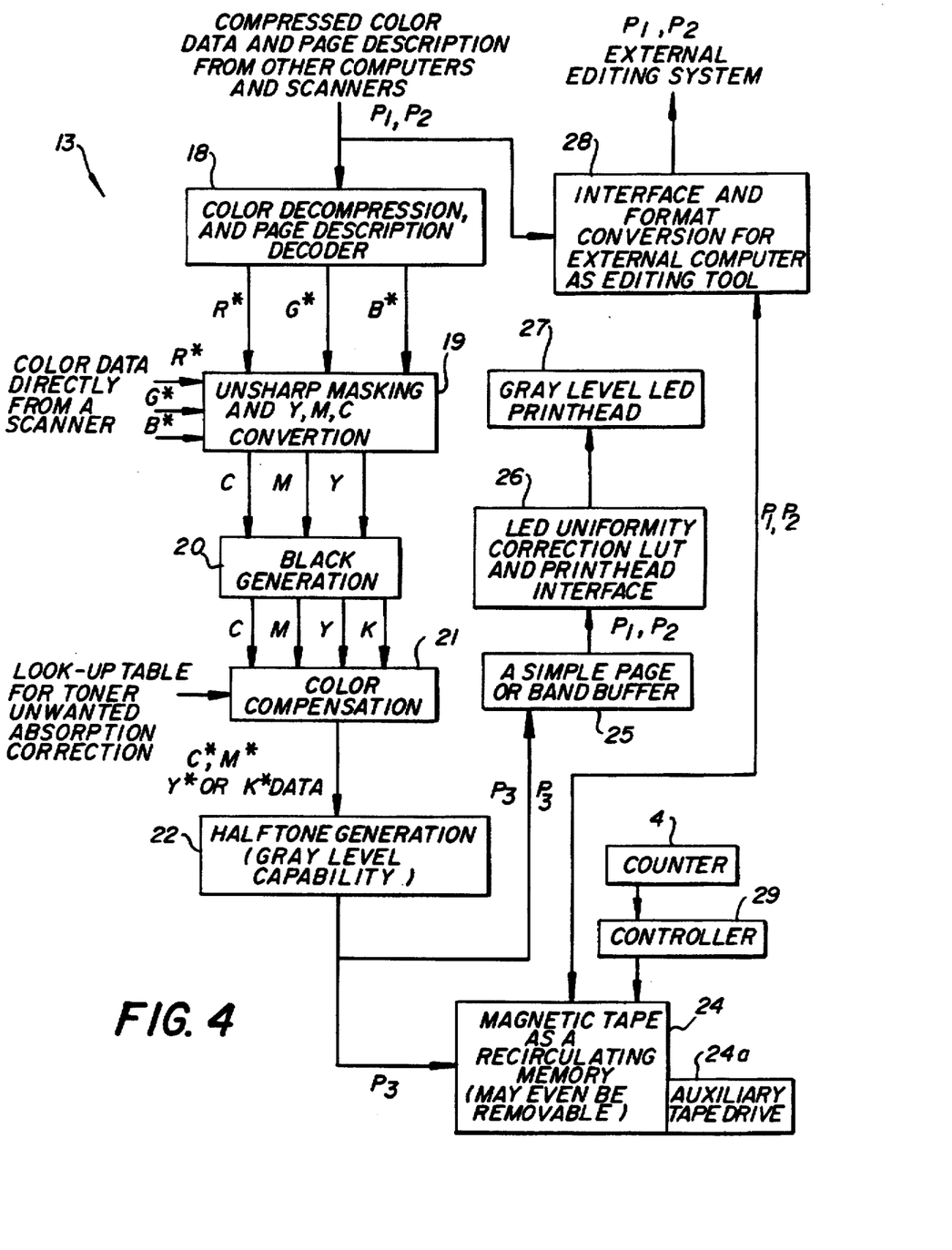
FIG. 4 illustrates block diagrams of further signal processing elements in the copier/printer of the invention.

The compressed color data P1 from the scanner or other scanners can then be sent through a computer network to other printers which do not have a scanner or to other computer systems for display and editing (see FIG. 3). After editing and other functions have been performed, the page description as well as the compressed color data ($P_2$) can then be passed back towards other printers in a network. Of course, for a printer that has a magnetic tape as its electronic recirculating feeder/memory (FIG. 4), both the compressed color data ($P_1$) or compressed color data with page description ($P_2$) can be sent back through the network towards the editing workstation for a later re-editing (see FIG. 3).

The third part of the electronic architecture includes a printer 13 with a streaming multi-channel magnetic tape as a recirculating electronic buffer (also an optional customer removable tape for archival, future update and data transfer between remote machines). In FIG. 4, there is shown a description of this part. As $P_1$ and $P_2$ are input into the printer via a network from the editing terminals or other scanners, the page description is then decoded (if it is included as in $P_2$), by a color decompression and page description decoder circuit 18 and the location of the images as well as other data is identified. The decoded text and other information (may be in a small band or page buffer) will be merged with the decompressed color image data $P_1$ in a line by line basis as R*, G*, B*.

The luminance information will then go through unsharp masking and Y, M, C conversion circuit 19. The chrominance as well as the unsharp masked luminance information will go through C, Y, M (cyan, yellow, magenta) conversion (the unsharp masking is only performed on the luminance signal rather than the chrominance signal to avoid color shift problem on image edges. The C, Y, M conversion refers to preparing color signals for each of the color toners that will be sequentially developed, cyan, yellow and magenta). Note that if the color data was obtained directly from an integral scanner, one does not have to go through the decompression step but one may directly use the R*, G*, B* data from the scanner (see FIG. 2).

The C,Y,M color data signal results are then processed through a black generation circuit which includes undercolor removal, skeleton black generation or grey component replacement. The C, M, Y, K data (K stands for black toner signal) resulting then goes through a color compensation circuit 21 that includes a look-up table to correct for the unwanted absorbtion of the toner set used. The compensated C*, M*, Y*, K* data then go through a circuit 22 providing for halftone generation, perhaps with gray level half tone capability (say 4 bits per pixel at 400 dpi resolution). Alternatively, the R*, G*, B* or L*, a*, b* signal can go through a tri-linear look-up table to obtain C*, M*, Y*, K* which basically includes the functionality of circuits 20, 21 and 22. The resulting output gray level halftone data signals, ($P_3$) can be loaded to a simple page/band buffer 25 as well as to the streaming magnetic tape drive 24.

In the case of just scanning and printing at the same time, one can just use the band buffer 25. If the data is from an editing workstation, one can either use the page buffer 25 or use the magnetic tape and drive 24 as a page buffer. Then the data can be downloaded to the band buffer 25 from the tape as $P_3$ data. In any case, the gray level image data $P_3$ will be transformed with the modification of the local printhead uniformity correction data as well as gray level tone reproduction data for the particular printing system (stored in a LUT) into say 6 bits/pixel printhead data and fed to the gray level LED printhead interface 26. In this sense, the image data signals $P_3$, are printer independent, i.e., a common data signal in the sense that they are usable for printers of the same type using similar process and halftone algorithms; but not truly device independent. Note only signals $P_1$ and $P_2$ are truly device independent as this term is used herein. The printhead correction means is resident in the machine and transparent to the user. Finally, the printing data is then used to control the LED printhead 27 to make prints.

Further details regarding a grey level LED printhead with a look-up table to control uniformity are provided in U.S. application Ser. No. 07/290,002, U.S. Pat. No. 5,300,960, assigned to the assignee of this application and the contents of which are incorporated herein by this reference. As noted in that application, a grey level printhead may include several thousand LED's (light-emitting diodes) that are arranged in a single row and located facing a photosensitive medium such as a photographic film or in this case, photoconductive surface. By selective activation of the LED's for predetermined periods of time, latent electrostatic images may be recorded on the photoconductor and developed with suitable toners and then transferred in register to a record member such as plain paper.

Since LED's on the printhead do not emit uniformly, it is known to adjust their respective outputs by modifying the image data signals with an adjustment factor so that for the same image signal one LED will print the same density as another. In the referenced application, it is taught that a grey level printer having an image data signal of say four bits and thus defining 16 levels of grey including white (no print) may have the signal modified by a lookup table to six bits to define both grey level and uniformity correction for that LED. Thus, the look-up tables are prepared based on empirical data so that for each LED, a particular incoming four-bit grey level signal is modified by the look-up table to a six-bit signal $P_4$ that will control the pulse duration for generation of a pixel (picture element) by that LED for a predetermined time so that 16 levels of grey are still printable with correction for non-uniformity from LED to LED on that printhead. These modified image data signals $P_4$ are printer dependent since the signals are modified specifically to correct for the LED's on this particular printhead 27. The printer image data signals $P_3$ are common data signals that in the context described herein may be considered to be printer independent as they have not as yet been modified to adjust for the characteristics of this particular printer and thus may be used in other color grey level printers of the same type without compromise to image quality as long as such printers share commonality in color compensation and halftone algorithms which they would if printers are the same but for different printheads.

If the magnetic tape is used as a page buffer for $P_3$, it may also be used as an electronic recirculating buffer for printing multiple copies of multiple page documents with gray level image information without rescanning the original document set. In addition to that, if there is an extra additional tape drive 24a (non-resident tape drive) with customer removable tape (using a large portion of the electronics for the resident tape drive), the image information of the document can be removed by the customer for archival, reuse and re-editing purposes. The removable magnetic tape media also may serve as the transport media between printing engines that are not connected to the network which can be of an advantage when the image storage size is large especially for many gray level color images in a document set.

In addition to this, if the magnetic tape can accept the page description and color compression data ($P_1$ and $P_2$), these data can be stored and can be read out for editing purposes using an external computer and display instead of using the full color gray level data $P_3$. One can also use $P_1$ and $P_2$ information to reconstruct the page and image contents from data like $P_1$ and $P_2$, allowing more pages to be stored than if $P_3$ is stored. Under such circumstances, a possible configuration may be $P_3$ is stored in the resident tape which serves also as an electronic recirculating feeder. But the compressed color information and page description ($P_1$ and $P_2$) is stored in the operator removable tape. Therefore, if the operator has to use the document information for editing, $P_1$ and $P_2$ data are there. If the operator's tape is inserted into another printer (even of a different type), this information is then read to the color decompression and page description decoder, processed and image data $P_3$ is stored in the resident tape and output directly to the output band buffer for printing.

Other advanced features like an editing or digitizing board for selecting areas of a document to print on selected colors of image portions may be provided. In addition, slide input instead of reflection copy input, reduction, magnification, image shift, etc can be added onto this basic architecture too. Also, the removable magnetic cartridge can be replaced by an erasable optical disk or other mass memory means so random access will become possible too.

Figure 5:
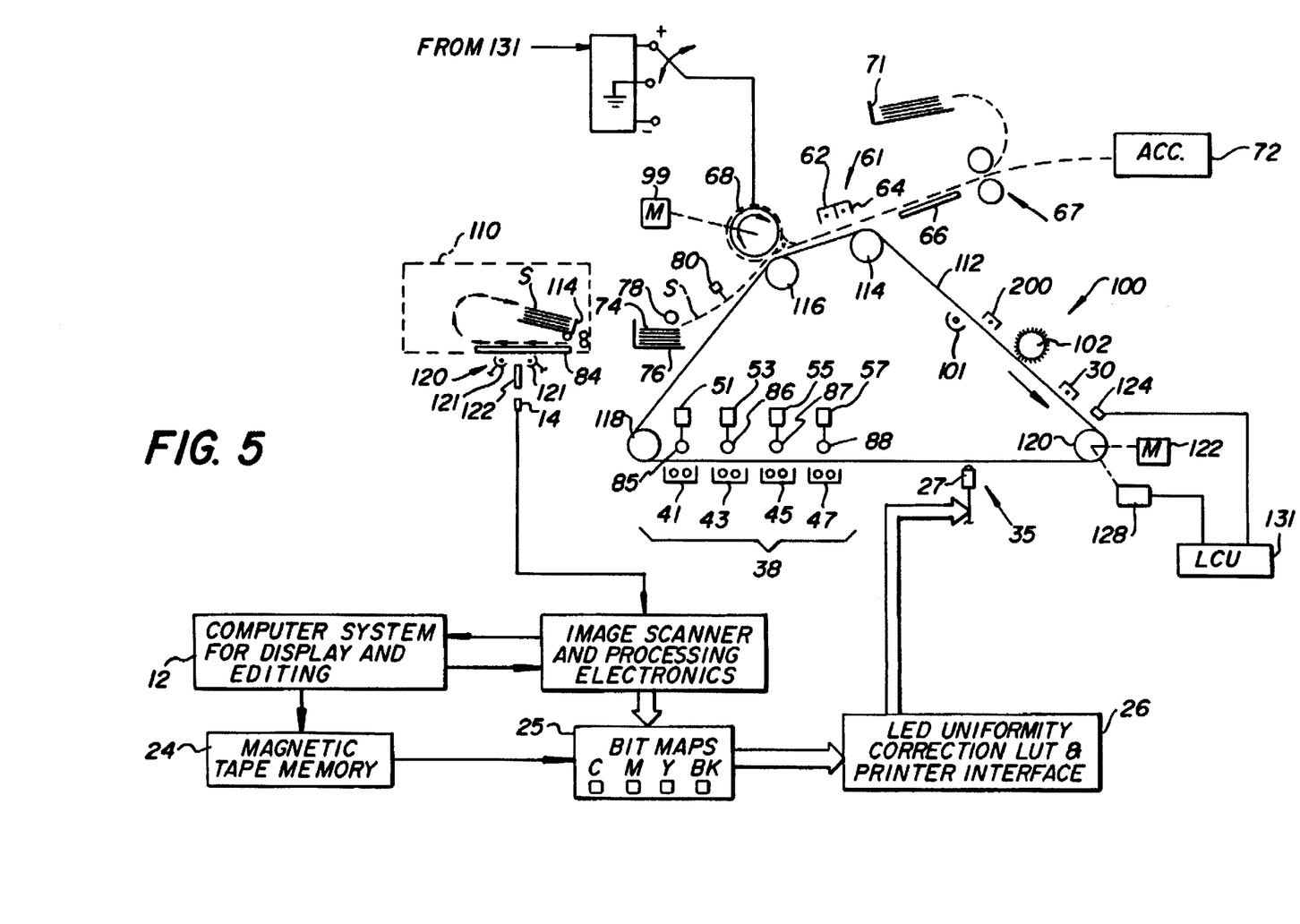
FIG. 5 illustrates a schematic of an electrophotographic copier/printer illustrating an additional portion of the copier/printer system of the invention.

With reference now to FIG. 5, a schematic of an electrophotographic reproduction apparatus 100 is shown and forms the printer engine of printer 13.

The apparatus 100 includes a closed loop, flexible image transfer member or photoconductive web 112. The web 112, is supported on rollers 114, 116, 118 and 120. The rollers are mounted on the apparatus frame (not shown) with one of the rollers, for example, roller 120, rotatively driven by a motor 122 to effect continuous movement of the web 112 in a clockwise direction about its closed loop path. The web has a plurality of sequentially spaced, nonoverlapping image areas which pass successively through electrophotographic processing stations (charge, expose, develop, transfer, clean) located about the path of the web. The web also includes timing marks (or regularly spaced perforations) which are sensed by appropriate means, such as timing signal generator 124 to produce timing signals. Such signals are sent to a computer controlled logic and control unit (LCU) 131. The LCU 131 controls the entire electrophotographic process based on the instantaneous location of the web in the travel path. An encoder 128 associated with the roller drive motor 122 also produces timing signals for the LCU. The signals from the encoder cause the LCU to fine tune the process timing. The LCU 131 has a digital computer, preferably a microprocessor. The microprocessor has a stored program responsive to the input signals for sequentially actuating, then deactuating the work stations as well as for controlling the operation of many other machine functions.

Programming of a number of commercially available microprocessors is a conventional skill well understood in the art. This disclosure is written to enable a programmer having ordinary skill in the art to produce an appropriate control program for the microprocessor(s). The particular details of any such program would, of course, depend on the architecture of the designated microprocessor.

A document feeder 110 such as, for example, a recirculating feeder or straight-through document feeder is provided to advance serially original document sheets stored in a document tray 114 toward the exposure platen 84. The copier logic is also changed to allow the operator to use the keyboard to input the number of copies and other exposure data. As the document sheets are driven towards the platen, a narrow aperture directs a narrow beam of light from lamps 121 onto the document at an exposure station 120. Each line of the sheet is scanned by scanner 14 which receives an image formed by an imaging lens system such as a Selfoc lens array 122 of the narrow area of the document being scanned.

Reproduction of an image on a document sheet results from electronically recording on the photoconductive web 112 by modulating same with electronic data signals an electrostatic charge that has been deposited thereon. The timing of recording is controlled by the LCU and related to the travel of the web 112 to expose adjacent, nonoverlapping areas of the web to the images of the document sheets. One or more corona charging units, exemplified by corona charger 30, is located upstream of the exposure area 35 and applies a uniform primary electrostatic charge, of say negative polarity, to the web 11 as it passes the charger and before it enters the exposure area. The photoconductive properties of the web cause the primary charge in the exposed areas of the web to be discharged in that portion struck by the exposure light. This forms latent imagewise charge patterns on the web in the exposed areas corresponding to the image on the document sheet.

In accordance with the signals stored in the bit map or page buffer 25, the electronic printer means 27 is provided to form on each of four image frames of the web 112 an electrostatic image of the subtractive color information provided on the original document. Further discussion regarding this printer means will be described later. Thereafter, travel of the web then brings the area bearing the four image frames into a development area 38. The development area has four magnetic brush development stations, one (41) containing a toner having a black pigmentation, the others containing toners of cyan, magenta and yellow colored pigmentation. The toner particles are agitated in the respective developer stations to exhibit a triboelectric charge of similar polarity to the latent imagewise charge pattern. Backup rollers 85, 86, 87 and 88 located on the opposite side of the web 112 from the development area, are associated with respective developer stations 41, 43, 45 and 47. Actuators 51, 53, 55, 57 selectively move respective backup rollers into contact with the web 112 to deflect the web from its travel path into operative engagement with respective magnetic brushes. The charged toner particles of the engaged magnetic brush are attracted to the discharged latent imagewise pattern to develop the pattern in accordance with a so-called neg-pos development process. Of course, the polarity of the web and toners described above is exemplary and positive toners may be used with positively charged webs for neg-pos development as well as other appropriate combinations of polarities for pos-pos development.

The logic and control unit 131 selectively activates an actuator in relation to the passage of an image frame that is to be processed with the respective color toner. Where the first image frame is to be developed with black toner and the second image frame is to be developed with the cyan toner and as the image frame containing the image to be developed in black reaches the development station 41, actuator 51 moves the backup roller 85 to deflect the web so that the latent charge image is developed by attracting black toner particles from the station 41. As soon as the image area leaves the effective development area of the station 41, the actuator 51 returns the backup roller 85 to its nondeflecting position. A similar cycle is accomplished by the logic and control unit 131 for the development of the second and subsequent image frames or sectors containing the respective subtractive color information with use of the respective toners from stations 43. In this regard, actuators 52 and backup rollers 86 are employed.

The developed black and color toned image frames must be transferred to a receiver sheet in accurately registered superimposed relation to form a reproduction of the original document sheet. Apparatus for providing such registered transfer are fully described in U.S. Pat. Nos. 4,477,176, issued Oct. 16, 1984 and 4,251,154, issued Feb. 17, 1981 in the name of Matthew J. Russel, the contents of which are incorporated herein by this reference. Briefly, this is accomplished by feeding a receiver sheet or support S of say plain paper, from a supply stack 74 stored in hopper 76, in synchronism with movement of the first image frame so that the receiver sheet engages the web and is registered with the first image frame. A transfer roller 68 includes a compliant insulating surface thereon and is biased to a potential suitable for transfer of the developed image on the first image sector to the receiver sheet S and to tack receiver sheet S to roller 68. Roller 68 is driven by a stepper motor 99 which receives actuating signals from the LCU 131.

Continued movement of the web 112 and synchronized rotation of roller 68 brings the lead edge of the copy sheet back into transferable relationship with the web as the lead edge of the next toner image arrives at roller 68 and after two additional revolutions to transfer a total of three image frames, the bias on the roller 68 is reversed to repel sheet S away from roller 68 back into contact with web 112. Receiver sheet S will be carried by web 112 so that the receiver sheet is in registration with the image on the fourth image frame. This image is transferred to the receiver sheet by charger 61 including transfer charger 62 and detack 64. The copy sheet is separated from the web and conveyed by either vacuum transport or as shown air transport 66 to roller fuser 67 and then to exit hopper 71 or an accessory finishing unit 72. The use of the recirculating feeder as described above will provide for collated sets of copies where the multisheet document is arranged in collated order in tray 114 with the first sheet at the top and the sheets are fed one at a time from the bottom beginning with the last sheet in order of collation and returned back to the top. Even though a multiple number of collated sets is desired, each sheet will be recirculated only once with electronic memory storing the image information for subsequent collated sets.

While the developed image is being fixed in fuser 67, the web 112 continues to travel about its path and proceeds through a cleaning area.

To facilitate toner removal from the web, a corona charging station 200 and a rear erase lamp 101 may be located upstream of a cleaning unit 102 to neutralize any charge remaining on the web and thus reduce the adherence forces of the toner to the web.

The locations of the image frames are known based on conventional timing signals used for making the exposure onto each of the frames. As each image frame passes above the electronic printer signals from respective bit maps 25 are inputted through interface 26. These signals correspond to those that are to be developed in the respective color to reproduce the indicia of the original document 5. In the preferred embodiment, the printer records by enabling light-emitting diodes for predetermined periods related to the data to be printed. Other exposure or recording systems may be used including laser, LCD, etc. The LED's may comprise a linear bank of LED arrays situated transverse to and proximate the web surface or as shown in FIG. 5, the array of LED's 27 may illuminate the web via optical fibers arranged at one end as a linear array, and gradient index lens array, such as SELFOC (trademark of Nippon Sheet Glass Co., Ltd.) array which focuses light from the linear array of fibers onto the photoconductor 112. With the passage of an image frame over the electronic printer means, signals are provided from bit map 25. That is signals in the bit map corresponding to image areas on the original are outputted to the LCU for illumination of appropriate LED's to selectively record the information on each image frame.

In the use of an electronic printer apparatus of FIG. 1, it is preferred to use a photoconductor and toning system that will attract toner particles to areas of the photoconductor that have been exposed. This is done since in most documents the background constitutes the major area of the document. For reproduction of the first image frame, the LCU actuates the LED printer array 27 (which may include a gradient index lens array not shown) through drivers 48 to output a beam of light to expose each pixel size area for information to be reproduced in black as indicated by the binary signal stored in bit map 25. Similarly, for exposure of the information to be reproduced with the colored toners on the second and subsequent frames, the signals from the LCU illuminate the LED printer array to "print out" only that information which is to be developed with the respective toner.

Referring back now to FIGS. 1–4, it is assumed that the printing system is to print several copies of a multi-page document, or stack of separate pages which will be referred to as the original pages. The original pages are fed seriatim by the feeder into the page scanner 11 which optically scans the content of each page and transforms the page content to a series of digital signals to obtain data suitable for magnetic storage. Operation of the scanner 10 is well-known by those skilled in the art and compression techniques may be employed to reduce the amount of data which must be stored.

The data from the scanner 10 is applied to the reversible tape system 24 where it is stored. This data may be in R*, G*, B* form, uniform color space L*, a*, b* or some other device independent form compressed (i.e., $P_1$) or uncompressed. A detailed description of the tape storage apparatus and method is contained elsewhere in this description. Briefly, the tape system 24 uses information from the counter 4, which can be set manually by the operator, to determine where the approximate middle of the multi-page document is located. The tape system 24 includes a reversible tape drive which records the data for the pages contained in the first half of the original document on one set of tracks, then reverses direction and records the original pages in the second half of the document in the other direction. Thus, when the last original page is scanned and recorded on the tape system 24, the tape is at the same place where the first original page was stored, therefore, it is not necessary to rewind the tape after the last page is stored, but merely reverse the tape direction to begin reading the first original page data.

The previous description is for an even number of original pages. For an odd number of original pages, the physical location of the tape in the last page is within a one-page distance from the first page, so rewinding by one page is done rather than rewinding through a multiple page document, as in the prior art. This one-page rewinding can be done during the interframe time of the printer. If a larger bit map buffer is employed for scanning and printing, the tape could be written with ½ page in the forward direction and ½ page in the reverse direction thus eliminating the rewind or fast-forward interval for odd numbers of pages. The larger buffer provides sufficient time for the tape to reverse and read-in the second half of the split page before it is needed.

Data read from the tape system 24 is transferred to the buffer 25 and then to the printhead 27 via interface 26 for printing if the data is in the form of $P_3$ data signals. If it is in $P_1$ or $P_2$ data signal form, then the data passes through interface 28 and station 12 for editing, if needed, then circuits 18, 19, 20, 21 and 22 to become a $P_3$ data signal and for printing via circuits 25, 26 and 27. The size of the buffer 25, which may be random access solid state memory, depends upon the speed and synchronization of the tape system 24 and the printhead 27. In ideal cases, the buffer 25 can be very small or not required at all. For a high speed print engine, it may be preferred to have all four color image frames bit-mapped for one page to be printed as shown in FIG. 5 before beginning a print operation. A second set of four-bit maps may also be provided to allow filling of one set while printing from the other. The buffer 25, as well as the digitizer 10, the tape system 12, and the printhead 18, are all under the control of the controller 29, which may form a part of the logic and control unit 31 and which can be a microprocessor suitably programmed to sequence the operation of the major printer elements shown in FIGS. 1–4 in the manner described. It is emphasized that counter 4 may be replaced by a mechanical or electronic system for counting the number of original pages. The important requirement is that the controller 29 knows approximately where the middle of the stack is located to determine when to reverse the tape system 24.

Figure 6:
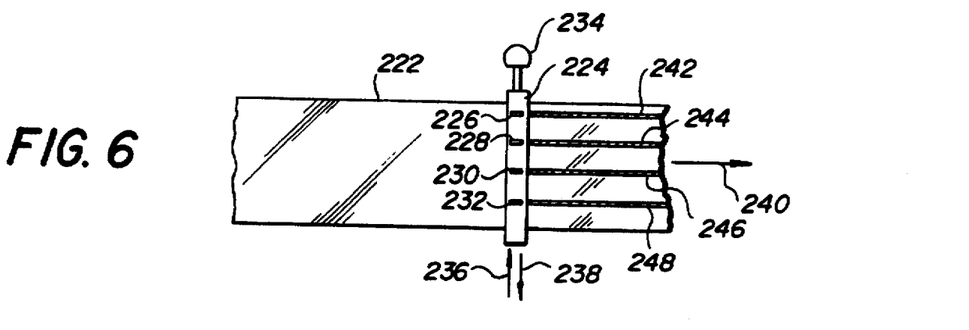
FIG. 6 is a view of a magnetic tape segment illustrating memory recording in accordance with the invention.

A general illustration of the reversible tape system 24 of FIG. 1 is shown in FIG. 6. According to FIG. 6, the magnetic recording tape 222 is positioned adjacent to a read-write head assembly 224 which includes separate read-write heads 226, 228, 230 and 232. The head assembly 224 is constructed of the thin film type with multiple parallel heads operating simultaneously to increase the through-put or recording speed of the tape system. Although FIG. 6 shows a recording head assembly having four separate heads, it is within the contemplation of this invention that more or less heads may be used. The head assembly 224 is connected to the stepping motor 234, or other means, for the purposes of moving the head assembly 224 in a lateral direction represented by the arrows 236 and 238. The stepping motor 234 could also be a solenoid or actuator which would be capable of moving the head assembly 224 in the lateral directions to change the azimuth of the head with respect to the tape 222. Although described as a movable head assembly, the recording and playback heads could have other configurations. For example, the heads could be permanently fixed into position with alternate or interleaved heads being selectively and independently accessed to use interleaved tracks when the tape is reversed.

Assuming that the tape 222 moves in the direction 240 under the head assembly 224, the recorded data is contained in the tracks 242, 244, 246 and 248. While the actual content of the recorded tracks will be shown in more detail in FIG. 7. FIG. 6 illustrates the general location of the recorded tracks on the tape 222. Tape 222 is of the streaming, reel to reel, type having a fixed length determined primarily by the maximum number of original pages which the printer is capable of reproducing.

Figure 7:
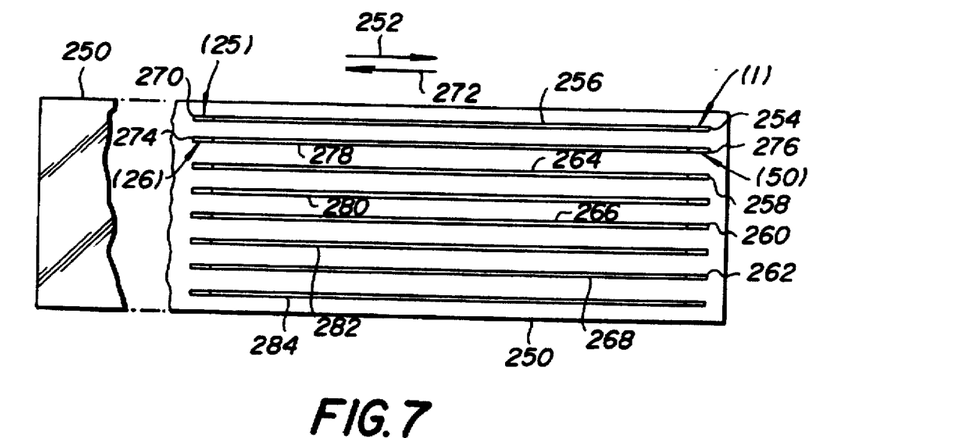
FIG. 7 is a view of a recorded tape segment produced in accordance with the invention.

FIG. 7 illustrates, in detail, the recording tracks positioned on the tape used for the reversible tape system 24 in FIG. 1. Although the tape 250 of FIG. 7 is similar to the tape 222 of FIG. 6, it is illustrated with a fixed length and with intermediate tracks, which will be discussed later. The tracks on the tape 250 were produced by moving the tape across the recording head originally in the direction 252. Assuming a 50-page document, data representing the first page of the document is recorded at segment 254 on track 256. Because of the parallel operation of the high speed head assembly, data corresponding to page 1 is also included at segments 258, 260 and 262 of tracks 264, 266 and 268, respectively, although these segments are not specifically identified in FIG. 7 as containing page 1 data. As the scanner is scanning the page data and the tape 250 is moving in direction 252, page data is sequentially recorded on the tracks so that the segment adjacent to segment 254 would contain data for page 2 and progressively until the data for page 25 is recorded on segment 270. After page 25 data has been recorded, the tape 50 reverses direction and moves in the direction 272, and the tape head moves transversely one-half of the track to track spacing, or an alternate set of heads are accessed if the head assembly is so constructed. Data continues to be recorded sequentially with data for page 26 being contained in segment 274 and data for the last page, page 50, contained in segment 276. It is pointed out that the parallel operation of the high speed heads provides corresponding data of the same pages on tracks 256, 264, 266 and 268, and on tracks 278, 280, 282 and 284.

As is shown in FIG. 7, the first half of the stack of original pages is recorded when the tape is moving in direction 252. Then, the head is moved and the tape 250 is reversed and moves in direction 272 to record the second half of the original pages. Thus, when the last page, page 50, is recorded, the head assembly will be positioned at a location along the tape 250 for reading data corresponding to page 1, simply by reversing the direction of the tape 250 and indexing or moving the head assembly laterally one-half of the track to track spacing back to its original position.

The tape recording process for each of the 50 pages is performed once in the printing process. Reading the recorded tape information by moving the tape in both directions and indexing the heads through one complete cycle occurs for each copy of the multi-page document required. Because of the position of the tape and head relative to each other when data for the last page of the document is read, insignificant delay is produced when data for the first page of the document for the next copy is required.

A slight delay would be developed when there is an odd number of pages contained in the original document. This is because the length of the two tracks which are recorded in each direction would not be exactly the same. Depending upon the break for the change of direction determined by the controller of the system, there would be one less page recorded between the two hi-directional tracks. Utilizing a one-page buffer in the printer can eliminate the one-page data accessing time delay if such is a critical problem to the overall speed of the printer. However, in most applications, the delay caused by an odd number of pages should be easily tolerated. Synchronizing of the tape speed, read-write head movement, and printhead speed can further increase the through-put of the printer by performing the tape reversal and head movement at times when the printhead is not requiring data because of its own timing overhead requirements. In the case where the printhead is effectively an electrophotographic printing device having an image loop, synchronization of the tape reversal and head movement with the frames on the image loop to make the movements during interframe time can also increase the through-put time of the printing apparatus.

Still other types of printing systems using tape as a storage media may be provided and in this regard, reference is made to our U.S. Pat. No. 4,916,561, the contents of which are incorporated herein by this reference.

Although the preferred embodiments of the invention have been described with reference to magnetic tape as a storage medium in its broader aspects, the invention may be used with recording media such as a floppy disk, optical disk or the like.

While the invention has been described with particular reference to preferred embodiments thereof, it will be understood that variations and modifications can be effected within the spirit and scope of the invention.

What is claimed is:

1. A copier/printer system comprising:

an image scanner including means for scanning a document sheet and means for generating digital signals in a first form representing an image scanned;

means responsive to the digital signals for displaying an image of the document sheet, means for editing an image of the document sheet, and means for outputting digital signals in a second form representing an edited version of the document sheet;

first printer means responsive to the digital signals in said second form for modifying said signals in said second form into signals in a third form in which the signals in said third form are rasterized for grey level printing, said first printer means further including memory means for storing said signals in said third form, and first uniformity correction means for correcting data stored as signals in said third form by modifying said data to signals in a fourth form so that said data is corrected for output by said first printer means, said memory means being removable for connection to a second printer means so that the data stored in said memory means as signals in said third form is printed by the second printer means, the second printer means including second uniformity correction means for correcting data stored as signals in said third form for printing.

2. The copier/printer system of claim 1 and wherein the memory means stores data signals representing data from multiple document sheets and wherein the first printer means prints copies in collated order using data recirculating from the memory means and further wherein the memory means includes a tape and further includes means for scanning the tape in one direction and means for generating data signals representing information on at least some of said multiple document sheet originals and means for scanning the tape in an opposite direction to said one direction and means for generating data signals representing information on other document sheet originals of said multiple document sheet originals.

3. The copier/printer system of claims 1 or 2 and wherein the first printer means includes means for printing in plural colors.

4. The copier/printer system of claim 3 and wherein the first printer means includes means for modifying the signals in the second form for converting said signals in the second form in accordance with the colors to be used in printing.

5. The copier/printer system of claims 1 or 2 and wherein the first printer means includes a plurality of light-emitting recording elements and wherein said uniformity correction means corrects data stored as signals in said third form by modifying said data in accordance with light emission characteristics of individual recording elements to form said signals in said fourth form.

6. A copier/printer system comprising:

an image scanner including means for scanning a document sheet and means for generating digital signals in a first form representing an image scanned;

means responsive to the digital signals for displaying an image of the document sheet, means for editing an image of the document sheet and means for outputting digital signals in a second form representing an edited version of the document sheet;

first printer means responsive to the digital signals in said second form for modifying said signals in said second form into signals in a third form in which the signals in said third form are rasterized data for grey level printing, said first printer means further including memory means for storing said rasterized data as said signals in said third form and first correction means for correcting rasterized data stored as signals in said third form by modifying said signals in said third form to signals in a fourth form so that said rasterized data is corrected for output by said first printer means;

network means communicating said memory means to a second printer means for printing;

said second printer means being coupled to said memory means through said network means, said second printer means including second correction means for correcting rasterized data stored as signals in said third form to signals in a fourth form so that rasterized data stored in said memory means as signals of said third form are corrected by said correction means, in accordance with characteristics of said second printer means, to signals in said fourth form for printing.

7. The copier/printer system of claim 6 and wherein the memory means stores data signals representing data from multiple document sheet originals and wherein the first printer means prints copies in collated order using data recirculated from the memory means and further wherein the memory means includes a tape and further includes means for scanning the tape in one direction to generate data signals representing information on at least some of said multiple document sheet originals and means for scanning the tape in an opposite direction to said one direction to generate data signals representing information on other document sheet originals of said multiple document sheet originals.

8. The copier/printer system of claims 1 or 6 and wherein the first printer means includes a plurality of light-emitting recording elements and wherein said first correction means corrects rasterized data stored as signals in said third form by modifying said rasterized data in accordance with light emission characteristics of individual recording elements of said first printer means to form said signals in said fourth form and said second printer means includes a plurality of light-emitting recording elements and wherein said second correction means corrects rasterized data stored as signals in said third form by modifying said rasterized data stored as signals in said third form in accordance with light-emission characteristics of individual recording elements of said second printer means to form said signals in said fourth form; and further wherein the memory means stores data signals representing data from multiple document sheet originals and the first printer means prints copies in collated order using data recirculated from the memory means.

9. The copier/printer system of claim 8 and further wherein the memory means includes a tape and further includes means for scanning the tape in one direction to generate data signals representing information on at least some of said multiple document sheet originals and means for scanning the tape in an opposite direction to said one direction to generate data signals representing information on other document sheet originals of said multiple document sheet originals.

10. The copier/printer system of claims 6 or 7 and wherein the first printer means includes a plurality of light-emitting recording elements and wherein said first correction means corrects rasterized data stored as signals in said third form by modifying said rasterized data in accordance with light emission characteristics of individual recording elements of said first printer means to form said signals in said fourth form and said second printer means includes a plurality of light-emitting recording elements and wherein said second correction means corrects rasterized data stored as signals in said third form by modifying said rasterized data stored as signals in said third form in accordance with light-emission characteristics of individual recording elements of said second printer means to form said signals in said fourth form.

11. The copier/printer system of claims 6 or 7 and wherein the first printer means includes means for printing in plural colors.

* * * * *